United States Patent
Bollmann et al.

(10) Patent No.: US 8,999,086 B2
(45) Date of Patent: Apr. 7, 2015

(54) JOINING OF MOULDINGS OF DIFFERENT POLYAMIDE COMPOUNDS

(75) Inventors: Sonja Bollmann, Haltern am See (DE); Rainer Goering, Borken (DE); Franz-Erich Baumann, Duelmen (DE); Andreas Dowe, Borken (DE); Vera Schiemann, Marl (DE)

(73) Assignee: Evonik Degussa GmbH, Essen (DE)

( * ) Notice: Subject to any disclaimer, the term of this patent is extended or adjusted under 35 U.S.C. 154(b) by 779 days.

(21) Appl. No.: 12/674,286

(22) PCT Filed: Aug. 13, 2008

(86) PCT No.: PCT/EP2008/060618
§ 371 (c)(1),
(2), (4) Date: Feb. 19, 2010

(87) PCT Pub. No.: WO2009/027231
PCT Pub. Date: Mar. 5, 2009

(65) Prior Publication Data
US 2011/0217559 A1    Sep. 8, 2011

(30) Foreign Application Priority Data
Aug. 31, 2007  (DE) .......................... 10 2007 041 488

(51) Int. Cl.
| | | |
|---|---|---|
| B29C 65/00 | (2006.01) | |
| C08L 77/02 | (2006.01) | |
| C09J 5/06 | (2006.01) | |
| C08J 5/12 | (2006.01) | |
| B29C 65/06 | (2006.01) | |
| B29C 65/08 | (2006.01) | |
| B29C 65/10 | (2006.01) | |
| B29C 65/14 | (2006.01) | |
| B29C 65/16 | (2006.01) | |
| B29C 65/20 | (2006.01) | |
| B29C 65/34 | (2006.01) | |
| B29C 65/82 | (2006.01) | |
| B29K 77/00 | (2006.01) | |
| B29K 101/12 | (2006.01) | |
| B29L 23/00 | (2006.01) | |

(52) U.S. Cl.
CPC .. *C09J 5/06* (2013.01); *B29C 65/06* (2013.01); *B29C 65/0672* (2013.01); *B29C 65/08* (2013.01); *B29C 65/10* (2013.01); *B29C 65/14* (2013.01); *B29C 65/1435* (2013.01); *B29C 65/16* (2013.01); *B29C 65/20* (2013.01); *B29C 65/34* (2013.01); *B29C 65/342* (2013.01); *B29C 65/8207* (2013.01); *B29C 66/71* (2013.01); *B29C 66/712* (2013.01); *B29K 2077/00* (2013.01); *B29K 2101/12* (2013.01); *B29L 2023/22* (2013.01); *C08J 5/121* (2013.01); *C08J 2377/00* (2013.01); *C08L 77/02* (2013.01); *B29C 65/3476* (2013.01); *B29C 65/8215* (2013.01); *B29C 66/522* (2013.01)

(58) Field of Classification Search
USPC .................. 156/60, 73.1–73.6, 272.8, 304.6; 428/474.4–474.9, 475.5
See application file for complete search history.

(56) References Cited

U.S. PATENT DOCUMENTS

| | | | | |
|---|---|---|---|---|
| 4,959,403 | A  * | 9/1990 | Bartmann et al. | ............ 524/169 |
| 5,032,633 | A  * | 7/1991 | Schlobohm et al. | ........... 524/168 |
| 6,783,821 | B2 * | 8/2004 | Ries et al. | .................... 428/34.1 |
| 7,025,842 | B2 | 4/2006 | Monsheimer et al. | |
| 2002/0066526 | A1 | 6/2002 | Isobe et al. | |
| 2003/0124281 | A1 | 7/2003 | Ries et al. | |
| 2004/0140668 | A1 | 7/2004 | Monsheimer et al. | |
| 2005/0228145 | A1* | 10/2005 | Lacroix et al. | ................ 525/420 |
| 2007/0059469 | A1* | 3/2007 | Amouroux et al. | ........ 428/36.91 |
| 2008/0217821 | A1 | 9/2008 | Goring et al. | |
| 2008/0292824 | A1 | 11/2008 | Haeger et al. | |

FOREIGN PATENT DOCUMENTS

| | | |
|---|---|---|
| DE | 2 147 420 | 3/1972 |
| EP | 1 195 419 | 4/2002 |
| EP | 1 403 030 | 3/2004 |
| JP | 2007119519 A  * | 5/2007 |

OTHER PUBLICATIONS

Machine translation of JP 2007119519A (2012).*
"Concise Encyclopedia of Plastics" Rosato et al. Springer. 2000. p. 157. ISBN 9780792384960.*
U.S. Appl. No. 09/044,797, filed Mar. 20, 1998, Brudny, et al.
U.S. Appl. No. 12/374,832, filed Jan. 23, 2009, Dowe, et al.

* cited by examiner

*Primary Examiner* — Callie Shosho
*Assistant Examiner* — John Freeman
(74) *Attorney, Agent, or Firm* — Oblon, McClelland, Maier & Neustadt, L.L.P.

(57) ABSTRACT

A molding compound for joining two moldings each made of a PA11 and/or PA12 molding compound contains at least 50% by weight of a polyamide component so chosen that it is preparable from linear aliphatic diamines and dicarboxylic acids and/or lactams or ω-aminocarboxylic acids, there being 11 to 12 carbon atoms present per carboxamide group in the repeating units, and, furthermore, this polyamide component containing not more than 80% by weight of either one of the polyamides PA11 and PA12. With this compound a firm weld is obtained both to a PA11 molding and to a PA12 molding.

14 Claims, No Drawings

JOINING OF MOULDINGS OF DIFFERENT POLYAMIDE COMPOUNDS

The invention relates to a method of bonding two mouldings, of which one is composed of a PA11 moulding compound and the other of a PA12 moulding compound. The two mouldings are, for example, supply lines or discharge lines made of polyamide.

Pipes meeting heightened technical requirements for the transport, for example, of gases, oils or salts are presently produced primarily from PA11. The pipes in question are, for instance, gas line systems, industrial lines (for chemical wastewater, for example) and oil extraction lines (offshore lines). Where these pipes have to be switched or repaired after damage, or where the supply network is extended with new sections, the ends or junctions are welded. For this purpose the plastic mouldings can be bonded by any of a very wide variety of plastics welding techniques; high-volume pipes in particular are bonded principally by means of heated-tool welding, heated-tool socket-fusion welding or heating-coil welding.

Since the recent introduction of new processing technologies, PA12 moulding compounds have found increasing use for the stated applications, owing to the outstanding suitability of this material for such applications. It is assumed that existing supply networks will have to be extended or repaired. Where these networks presently consist of PA11, their extension using parts composed of PA12, via what are called fittings, composed of PA11 or PA12, would present problems, since parts made of PA11 and PA12 cannot be bonded with adequate strength by the welding process. If, therefore, polyamide pipes are to be newly bonded, repaired or renovated, this can be carried out only with attention paid to the type of polyamide. In other words, PA11 must be laid only with PA11, and PA12 only with PA12. This presupposes that on the construction site these requirements are known and conscientiously observed. There is therefore a serious risk of a mix-up of material. As well as the risk of mix-up of the material, a further result is the increased logistical stockholding effort, since it is now necessary to store bonding pieces made of PA11 and those made of PA12 as well.

It is known that mouldings made of polyamides (e.g. pipe attachment element) and mouldings made of polyethylene (e.g. fuel tank) or polypropylene are bonded to one another via polyolefins which have been grafted with maleic anhydride (DE 195 35 413 C1) and which attach firmly both to PA11 and to PA12. In the case of junctions of polyamide to polyamide, this kind of bonding has no part to play, since polyamides are employed primarily in relatively high pressure sectors, where bonding elements made from functionalized polyolefins cannot be used, on account of inadequate mechanical properties.

The object is therefore to provide a moulding compound suitable for joining both PA11 mouldings and PA12 mouldings.

This object has been achieved through the use of a moulding compound for joining two mouldings each made of a PA11 and/or PA12 moulding compound, the moulding compound containing at least 50%, preferably at least 60%, more preferably at least 70%, with particular preference at least 80% and very preferably at least 90% by weight of a polyamide component so chosen that it is preparable from linear aliphatic diamines and dicarboxylic acids and/or lactams or ω-aminocarboxylic acids, there being at the same time 11 to 12 carbon atoms present per carboxamide group in the repeating units, with the further requirement that this polyamide component contains not more than 80%, preferably not more than 75%, more preferably not more than 70% and with particular preference not more than 65% by weight of either one of the polyamides PA11 and PA12. The polyamide component is preferably selected from PA1012, PA1210, PA1212, PA814, PA1014, PA618, PA11 and PA12.

In a first preferred embodiment, polyamides the moulding compound contains are PA1012 and PA11 in a weight ratio of 100:0 to 20:80, preferably 100:0 to 25:75, more preferably 100:0 to 30:70 and with particular preference 99.9:0.1 to 35:65.

In a second preferred embodiment, polyamides the moulding compound contains are PA1012 and PA12 in a weight ratio of 100:0 to 20:80, preferably 100:0 to 25:75, more preferably 100:0 to 30:70 and with particular preference 99.9:0.1 to 35:65.

In a third preferred embodiment, polyamides the moulding compound contains are PA1212 and PA11 in a weight ratio of 100:0 to 20:80, preferably 100:0 to 25:75, more preferably 100:0 to 30:70 and with particular preference 99.9:0.1 to 35:65.

In a fourth preferred embodiment, polyamides the moulding compound contains are PA1212 and PA12 in a weight ratio of 100:0 to 20:80, preferably 100:0 to 25:75, more preferably 100:0 to 30:70 and with particular preference 99.9:0.1 to 35:65.

In a fifth preferred embodiment, polyamides the moulding compound contains are PA1210 and PA11 in a weight ratio of 100:0 to 20:80, preferably 100:0 to 25:75, more preferably 100:0 to 30:70 and with particular preference 99.9:0.1 to 35:65.

In a sixth preferred embodiment, polyamides the moulding compound contains are PA1210 and PA12 in a weight ratio of 100:0 to 20:80, preferably 100:0 to 25:75, more preferably 100:0 to 30:70 and with particular preference 99.9:0.1 to 35:65.

In a seventh preferred embodiment, polyamides the moulding compound contains are PA618 and PA11 in a weight ratio of 100:0 to 20:80, preferably 100:0 to 25:75, more preferably 100:0 to 30:70 and with particular preference 99.9:0.1 to 35:65.

In an eighth preferred embodiment, polyamides the moulding compound contains are PA814 and PA11 in a weight ratio of 100:0 to 20:80, preferably 100:0 to 25:75, more preferably 100:0 to 30:70 and with particular preference 99.9:0.1 to 35:65.

In a ninth preferred embodiment, polyamides the moulding compound contains are PA814 and PA12 in a weight ratio of 100:0 to 20:80, preferably 100:0 to 25:75, more preferably 100:0 to 30:70 and with particular preference 99.9:0.1 to 35:65.

In a tenth preferred embodiment, polyamides the moulding compound contains are PA1014 and PA11 in a weight ratio of 100:0 to 20:80, preferably 100:0 to 25:75, more preferably 100:0 to 30:70 and with particular preference 99.9:0.1 to 35:65.

In an eleventh preferred embodiment, polyamides the moulding compound contains are PA1014 and PA12 in a weight ratio of 100:0 to 20:80, preferably 100:0 to 25:75, more preferably 100:0 to 30:70 and with particular preference 99.9:0.1 to 35:65.

In a twelfth preferred embodiment, polyamides the moulding compound contains are PA618 and PA12 in a weight ratio of 100:0 to 20:80, preferably 100:0 to 25:75, more preferably 100:0 to 30:70 and with particular preference 99.9:0.1 to 35:65.

In a thirteenth preferred embodiment, polyamides the moulding compound contains are PA11 and PA12 in a weight ratio of 80:20 to 20:80, preferably 75:25 to 25:75, more preferably 30:70 to 70:30 and with particular preference 35:65 to 65:35.

A fourteenth preferred embodiment is a combination of the first and third embodiments; the PA1012 is here replaced by a blend of PA1012 and PA1212 in a weight ratio of 99.9:0.1 to 0.1:99.9, preferably 95:5 to 5:95 and more preferably 90:10 to 10:90.

A fifteenth preferred embodiment is a combination of the first and fourth embodiments; here as well the PA1012 is replaced by a blend of PA1012 and PA1212 in a weight ratio of 99.9:0.1 to 0.1:99.9, preferably 95:5 to 5:95 and more preferably 90:10 to 10:90.

A sixteenth preferred embodiment starts from the thirteenth embodiment; there, 0.1% to 99.9%, preferably 5% to 95% and more preferably 10% to 90% by weight of the PA11 and/or PA12 is replaced by PA1012, PA1212, PA1210, PA814, PA1014 and/or PA618.

These and further embodiments may be combined with one another as desired.

PA11 is prepared by polycondensation of ω-aminoundecanoic acid, while PA12 is obtained by ring-opening polymerization of lauryllactam. Both polymers are available commercially in a multiplicity of grades. PA1012 is prepared by polycondensation of an equivalent mixture of 1,10-decanediamine and 1,12-dodecanedioic acid, while PA1212 is obtained in the same way from 1,12-dodecanediamine and 1,12-dodecanedioic acid. Similarly, PA1210 is prepared by polycondensation of equimolar mixtures of 1,12-dodecanediamine and sebacic acid, and PA618 by polycondensation of equimolar mixtures of hexamethylenediamine and 1,18-octadecanedioic acid. PA814 is obtained correspondingly from octamethylenediamine and 1,14-tetradecanedioic acid, and PA1014 from 1,10-decanediamine and 1,14-tetradecanedioic acid. The polycondensation is carried out normally in the melt.

The moulding compounds employed may contain not more than about 50% by weight of additives, which are selected from impact-modifying rubber and/or typical auxiliaries and adjuvants.

Impact-modifying rubbers for polyamide moulding compounds are state of the art. They contain functional groups which originate from unsaturated functional compounds, which have been either incorporated into the main chain by copolymerization or grafted onto the main chain. The most common are EPM rubber or EPDM rubber, which has been grafted free-radically with maleic anhydride. Furthermore, copolymers, including terpolymers, of ethylene, acrylic esters and maleic anhydride or of ethylene and glycidyl acrylate or glycidyl methacrylate, and also anhydride-functionalized, unhydrogenated or hydrogenated styrene-butadiene block copolymers are customary. Such rubbers may also be used together with a non-functionalized polyolefin such as isotactic polypropylene, for example, as described in EP-A-0 683 210.

The moulding compounds may further contain minor amounts of auxiliaries and/or adjuvants that are needed in order to set defined properties. Examples thereof are plasticizers, pigments or fillers such as carbon black, titanium dioxide, zinc sulphide, silicates or carbonates, processing assistants such as waxes, zinc stearate or calcium stearate, flame retardants such as magnesium hydroxide, aluminium hydroxide or melamine cyanurate, glass fibres, antioxidants, UV stabilizers and also additives which give the product anti-electrostatic properties or electrical conductivity, such as carbon fibres, graphite fibrils, fibres of stainless steel, or conductive carbon black, for example.

In one possible embodiment the moulding compounds contain 1% to 25% by weight of plasticizers, more preferably 2% to 20% and with particular preference 3% to 15% by weight. Plasticizers and their use in polyamides are known. A general overview of plasticizers suitable for polyamides can be found in Gächter/Müller, Kunststoffadditive, C. Hanser Verlag, 2nd edition, p. 296.

Typical compounds suitable as plasticizers are, for example, esters of p-hydroxybenzoic acid having 2 to 20 C atoms in the alcohol component, or amides of arylsulphonic acids having 2 to 12 C atoms in the amine component, preferably amides of benzenesulphonic acid.

Suitable plasticizers include ethyl p-hydroxybenzoate, octyl p-hydroxybenzoate, isohexadecyl p-hydroxy-benzoate, N-(n-octyl)toluenesulphonamide, N-(n-butyl)-benzenesulphonamide or N-(2-ethylhexyl)benzene-sulphonamide.

The bonding of two mouldings as claimed may involve the bonding of two mouldings of any kind, such as housing parts, pipes, pipe-like workpieces, closures and valves of any kind.

Joining takes place with the aid of any desired welding technique; mention may be made, by way of example, of heated-tool butt welding, heated-tool socket-fusion welding, heating-coil welding, vibration welding, ultrasonic welding, laser welding, the various hot-gas welding methods (hot-gas welding with fanning movement, high-speed hot-gas welding, hot-gas lap welding and hot-gas extrusion welding) and spin welding. Generally, in the case of the typical welding methods, a bonding element made from the as-claimed moulding compound is employed. Furthermore, the bonding element may be shaped in situ, by means of multi-component injection moulding, for example.

In the case of heated-tool butt welding, the workpieces are heated at the contact faces using a heated tool or a plurality of heated tools, and are welded under application of force, with or without a welding rod. Where the contact faces are not in direct contact with the heated tool (radiant heater), the technique is referred to as indirect heated-tool butt welding.

In the case of heating-coil welding, the workpieces are heated at the contact faces by means of a heating coil which remains in the welded bond. The joining forces come about as a result of thermal expansion of the workpieces, or are applied from the outside.

In the case of heated-tool socket-fusion welding, the workpieces are heated at the contact faces by a heatable mandrel element or socket and are then inserted one into the other. Joining forces necessary can be applied via the press fit of the workpieces.

In the case of hot-gas welding, the workpieces are heated at the contact faces with hot gas and are welded with application of force, with or without a welding rod. The joining forces are applied manually or mechanically.

Vibration welding is a friction welding technique in which the energy for melting and welding the parts to be joined is generated by an oscillating, relative frictional movement between the joining components, under the action of a sufficiently high frictional pressure. After the frictional movement has been discontinued, the joining faces, plastified by the frictional heating, are aligned and welded to one another under a defined pressure.

In the case of ultrasonic welding, longitudinal vibrations are transmitted from the sonotrode of the welding machine to the parts to be joined, generating a standing wave pattern in the parts to be joined. In zones of maximum alternating strains and stresses, the plastic melts as a result of intermolecular friction.

Laser welding can be carried out in the form either of laser butt welding or of laser transmission welding. In terms of process sequence, laser butt welding is the same as contactless heated-tool welding. In the case of laser transmission welding, thermoplastic parts having different absorption properties are welded. Prior to welding, the parts to be joined are brought into contact; the laser beam passes through the part that is transparent to it and is absorbed by the other part, which is generally modified with additives, and the joining zone is plastified.

In the case of spin welding (frictional welding) the workpieces are heated at the contact faces by friction and are welded with application of force, with or without a welding rod. The heat can be generated by movement of the workpieces relative to one another or by a friction element. The force is applied manually or mechanically.

For further information on the welding techniques, reference may be made to DIN 1910 Part 3.

In the context of the invention a suitable joining bond may be provided not only by the bonding elements (examples being the socket fitting in heated-tool socket-fusion welding, or the heating-coil socket in heating-coil welding) but also by the welding rods, made from the as-claimed polyamide moulding compounds, in the case of certain of the above-described welding techniques, particularly in the case of hot-gas welding. The bonding element is then generated in situ from the welding rod.

Multi-component injection moulding is advantageously carried out by placing the preformed parts to be joined in a mould and bonding them to one another by injecting a melt of the bonding-element moulding compound, the bonding element being moulded on. One suitable version of the process, for example, is Die Slide Injection Moulding.

All of these joining techniques are known to a person skilled in the art, and so further observations relating to them are superfluous.

In the examples below, the bond strength of different polyamide combinations are compared with one another.

To assess the possible bonding of the moulding compounds, welding tests were carried out by means of heated-tool butt welding, since heated-tool butt welding is a simple and commonplace technique. It is very important for the joining of panels and pipes and also of injection-moulded production-line articles, such as housings and containers made of thermoplastics. The welding tests took place in a procedure based on the DVS 2207 directive.

To start with, the plates to be bonded were clamped. The heated tool was inserted between the joining faces, so that the faces were in direct contact with the heated tool. A flow of heat from the heated tool into the parts to be joined resulted in the melting of the weld zone. This melting, referred to as the heating phase, was composed of a pressurized contacting operation and a heating operation without pressure.

The time within which the heated tool is removed and the two carriages are moved together until the parts to be joined come into contact is referred to as changeover time. During this time, the faces were exposed to the ambient temperature, and underwent cooling. On joining, under the joining pressure, the melt underwent a squeeze flow. At this stage, the melt flowed into the bead.

For the tests, depending on the melting point of the moulding compound, the heating time without pressure was varied. This means, specifically, that mouldings having a higher melting point were heated for longer than those having a lower melting point, before the mouldings were joined to one another.

Welding was ended by cooling under the joining pressure. The joining pressure was constant throughout the cooling phase. After the cooling operation, the parts were removed.

Strips were cut from the plates perpendicularly with respect to the joint face. The strips were then tested in an accelerated tensile test, in a method based on the DVS 2203 directive, and the bond strengths were ascertained.

Reference 1: Combination PA11/PA11; bond strength 34 MPa

Reference 2: Combination PA12/PA12; bond strength 35 MPa

Comparative Example 1: Combination PA11/PA12; bond strength 9 MPa

Inventive Example 1: Combination PA11/PA1012; bond strength 27 MPa

Inventive Example 2: Combination PA11/PA1212; bond strength 30 MPa

Inventive Example 3: Combination PA12/PA1012; bond strength 40 MPa

Inventive Example 4: Combination PA12/PA1212; bond strength 36 MPa

Inventive Example 5: Combination PA11/PA1210; bond strength 27 MPa

Inventive Example 6: Combination PA12/PA1210; bond strength 32 MPa

Inventive Example 7: Combination PA11/PA618; bond strength 24 MPa

Inventive Example 8: Combination PA12/PA618; bond strength 31 MPa

These findings, obtained here on the basis of binary bonds, are fully transposable to the corresponding ternary bonds.

The invention claimed is:

1. A method of bonding at least a first molding, and a second molding, comprising:
    welding at least a first preformed molding made of a PA11 molding compound and a second preformed molding made of a PA12 molding compound with a molding composition therebetween, wherein the molding composition comprises at least 50% by weight of a polyamide component, and wherein said polyamide component comprises at least one selected from the group consisting of PA1012, PA1210, PA1212, PA814, PA1014, PA618, PA11 and PA12, with the proviso that if either PA11 or PA12 or both PA11 and PA12 are present in said polyamide component, said polyamide component comprises not more than 80% by weight of either one of PA11 and PA12.

2. The method according to claim 1, wherein said welding comprises multi-component injection molding.

3. The method according to claim 1, wherein the molding composition comprises at least 60% by weight of the polyamide component.

4. The method according to claim 1, wherein the molding composition comprises at least 70% by weight of the polyamide component.

5. The method according to claim 1, wherein the molding composition comprises at least 80% by weight of the polyamide component.

6. The method according to claim 1, wherein the molding composition comprises at least 90% by weight of the polyamide component.

7. The method according to claim 1, wherein the polyamide component is PA1012, PA1210, PA1212, PA814, PA1014 or PA618.

8. The method according to claim 1, wherein the polyamide component comprises (1) one of PA1012, PA1210, PA1212, PA814, PA1014 and PA618, and (2) one of PA11 and PA12, in a weight ratio of (1):(2) of 99.9:0.1 to 35:65.

9. The method according to claim 1, wherein the polyamide component comprises PA1012 and PA1212 in a weight ratio of 99.9:0.1 to 0.1:99.9.

10. The method according to claim 1, wherein the polyamide component comprises PA11 and PA12 in a weight ratio of 80:20 to 20:80.

11. The method according to claim 1, wherein the polyamide component comprises PA11 and PA12 in a weight ratio of 35:65 to 65:35.

12. The method according to claim 1, wherein the polyamide component comprises not more than 75% by weight of either one of PA11 and PA12.

13. The method according to claim 1, wherein the polyamide component comprises not more than 70% by weight of either one of PA11 and PA12.

14. The method according to claim 1, wherein the polyamide component comprises not more than 65% by weight of either one of PA11 and PA12.

* * * * *